United States Patent
Sanghavi et al.

(10) Patent No.: US 10,439,974 B2
(45) Date of Patent: *Oct. 8, 2019

(54) SHARING OF ACTIVITY METADATA VIA MESSAGING SYSTEMS

(71) Applicant: Apple Inc., Cupertino, CA (US)

(72) Inventors: Mehul K. Sanghavi, San Jose, CA (US); Alexandre M. Macedo, Oakland, CA (US); Scott M. Witt, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,768

(22) Filed: Nov. 18, 2016

(65) Prior Publication Data
US 2017/0163589 A1 Jun. 8, 2017

Related U.S. Application Data

(63) Continuation of application No. 14/290,450, filed on May 29, 2014, now Pat. No. 9,503,410.

(51) Int. Cl.
*G06F 15/16* (2006.01)
*H04L 12/58* (2006.01)

(52) U.S. Cl.
CPC .............. *H04L 51/24* (2013.01); *H04L 51/04* (2013.01); *H04L 51/046* (2013.01)

(58) Field of Classification Search
CPC ....... H04L 51/24; H04L 51/046; H04L 51/04; H04L 12/58
See application file for complete search history.

(56) References Cited

U.S. PATENT DOCUMENTS

| | | | | |
|---|---|---|---|---|
| 7,444,379 | B2 * | 10/2008 | Becker | G06Q 10/107 709/206 |
| 7,972,215 | B2 * | 7/2011 | Evans | A63F 13/12 463/42 |
| 2005/0004985 | A1 | 1/2005 | Stochosky | |
| 2005/0027669 | A1 * | 2/2005 | Day | G06Q 10/107 |
| 2005/0165893 | A1 * | 7/2005 | Feinberg | G06F 11/302 709/205 |
| 2005/0166154 | A1 * | 7/2005 | Wilson | G06F 3/0481 715/751 |
| 2009/0307325 | A1 | 12/2009 | Szeto | |
| 2011/0183645 | A1 * | 7/2011 | Chawla | H04M 3/42357 455/410 |
| 2012/0202587 | A1 * | 8/2012 | Allen | G07F 17/3223 463/25 |
| 2013/0307920 | A1 | 11/2013 | Cahill | |
| 2013/0325967 | A1 | 12/2013 | Parks | |

(Continued)

*Primary Examiner* — Cheikh T Ndiaye
(74) *Attorney, Agent, or Firm* — Blank Rome LLP

(57) ABSTRACT

Systems and methods are provided for sharing activity information of devices engaged in a messaging session. In operation, the devices provide activity and sharing preference information to a data service. Thereafter, the data service generates notifications for the devices based on the activity, sharing preference, and device information, wherein the notifications include a payload with instructions for messaging clients at the devices to present user interface elements that allow users to access content and applications associated with other users in the messaging session.

20 Claims, 17 Drawing Sheets

(56) References Cited

U.S. PATENT DOCUMENTS

| | | | |
|---|---|---|---|
| 2014/0007083 A1* | 1/2014 | Baldwin | H04L 65/1016 |
| | | | 717/178 |
| 2014/0030980 A1 | 1/2014 | D'Ambrosio | |
| 2015/0163257 A1* | 6/2015 | Bank | H04L 65/1066 |
| | | | 709/204 |
| 2015/0163262 A1 | 6/2015 | Bank | |
| 2015/0341290 A1* | 11/2015 | Cherifi | H04L 51/043 |
| | | | 709/206 |

* cited by examiner

SHARING OF ACTIVITY METADATA VIA MESSAGING SYSTEMS

CROSS REFERENCE TO RELATED APPLICATIONS

This application is a continuation of, and claims the benefit of priority to, U.S. application Ser. No. 14/290,450, filed on May 29, 2014, which is expressly incorporated by reference herein in its entirety.

TECHNICAL FIELD

The present technology pertains to the operation and configuration of messaging systems, and more specifically pertains to the sharing of activity metadata via messaging systems.

BACKGROUND

Mobile devices are used for numerous types of communications. For example, a mobile device, such as a smartphone, can facilitate voice communication, web-based communications, and short messaging service (SMS) communications. Short messaging service communications (e.g., text messaging or instant messaging services) have become a part of life for many mobile device users. As text messaging services have gained popularity, publishers of content and applications alike have been exploring how to leverage text messaging services to their advantage.

For example, organizations like CNN and ESPN provide subscription services for users, so that users receive news and sports updates in the form of text messages. Such organizations may also append advertisements to such updates. However, the effectiveness of an advertisement campaign involving text messages may be limited, as users typically ignore such advertisements and targeting of users is typically limited. Moreover, "advertisement fatigue" may easily set in after receipt of several updates with advertisement attached thereto, prompting the user to discontinue their subscription altogether.

Another issue with existing advertising schemes via text messaging services is a misunderstanding of the content discovery process associated with users. In many cases, users searching for content of interest (e.g., news, music, movies, applications, etc.) typically look to family, friends, or colleagues for recommendations regarding content, as such persons are typically like-minded or at least have significant overlaps in interest. Accordingly, a recommendation from such persons is typically more effective to cause a user to take a particular action than any advertisement delivered to them via a text message. Therefore, there is a need for facilitating the discovery of content discovery among family, friends, colleagues, or other persons in close or trusted relationships.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for sharing activity information of devices engaged in a messaging session. In operation, the devices provide activity and sharing preference information to a data service. Thereafter, the data service generates notifications for the devices based on the activity, sharing preference, and device information, wherein the notifications include a payload with instructions for messaging clients at the devices to present user interface elements that allow users to access content and applications associated with other users in the messaging session.

In one embodiment, there is provided a methodology for operating a data service associated with the devices. This methodology can include receiving a first notification with a payload from a first device, where this payload includes activity information and sharing preference information associated with the first device. Concurrently, a second notification can be received from one or more second devices, which includes a payload indicating that the second devices are engaged in a messaging session with a first user at the first device.

In response to the receipt of such notifications, the data service can obtain device information for the second devices and assemble notifications for such devices based on the device information and the activity and sharing information for the first device. These notifications can include a payload specifying instructions for a messaging client at second devices. The instructions can be configured to cause the messaging client at the second devices to present at least one user interface element configured to allow at least one of content or an application associated with the activity information to be accessed at the second devices. Finally, these notifications are forwarded to the second devices.

In some configurations, the assembling can encompass identifying the capabilities of each of second devices based on the device information, determining a set of common capabilities for the second devices from the identified capabilities, and configuring the instructions based on the set of common capabilities. Alternatively, the assembling can include determining a portion of the second devices capable of providing the at least one user interface element at the messaging client associated with the messaging session and limiting the forwarding of the notification to the portion of the second devices.

In some configurations, the user interface elements can be further configured to allow the second users at the second devices to initiate an interactive session with the first user for the application associated with the activity information.

In some configurations, the activity information can include timestamps. Thus, the assembling can further include identifying a portion of the timestamps falling within a pre-defined time window and configuring the instructions based on the portion of the activity information associated with the identified portion of the timestamps. Additionally or alternatively, the user interface elements can include a time elapsed since content or application was last accessed by the first user at the first device. In some configurations, the user interface elements can be configured to store a link providing the access to the at least one of the content or the application.

In the event that the activity information indicates that the first user is unavailable for a messaging session, and the assembling can include configuring the instructions to prevent the messaging client from transmitting a message to the first user.

In a second embodiment, there is provided a methodology for operating a user device. The user device can be configured to transmit to a server, a first notification with a payload indicating that a messaging client at the first device is engaged in a messaging session with one or more second users. In response, the user device can receive, from the server, at least notification with a payload containing instructions for configuring user interface elements associated with at least one of the second users and configure the messaging client appropriately. The instructions can specify how to generate at least one user interface element indicating the at least one of a content or an application for the at least one of the second users and that allows the at least one of the content or the application to be accessed at the first device.

In some configurations, the at least one user interface element is configured to allow the first user at the first device to initiate an interactive session with the least one of the second users for the application associated with the at least one of the second users. Further, the at least one user interface element can be configured to present last access time information by the at least one of the second users for the at least one of the content or the application. Additionally, the at least one user interface element can be configured to allow the first user to store a link for accessing to the at least one of the content or the application.

In some configurations, the notification may indicate that one or more of the second users are unavailable for a messaging session the payload can provide instructions that prevent the first device from transmitting a message to the one or more of the second users.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
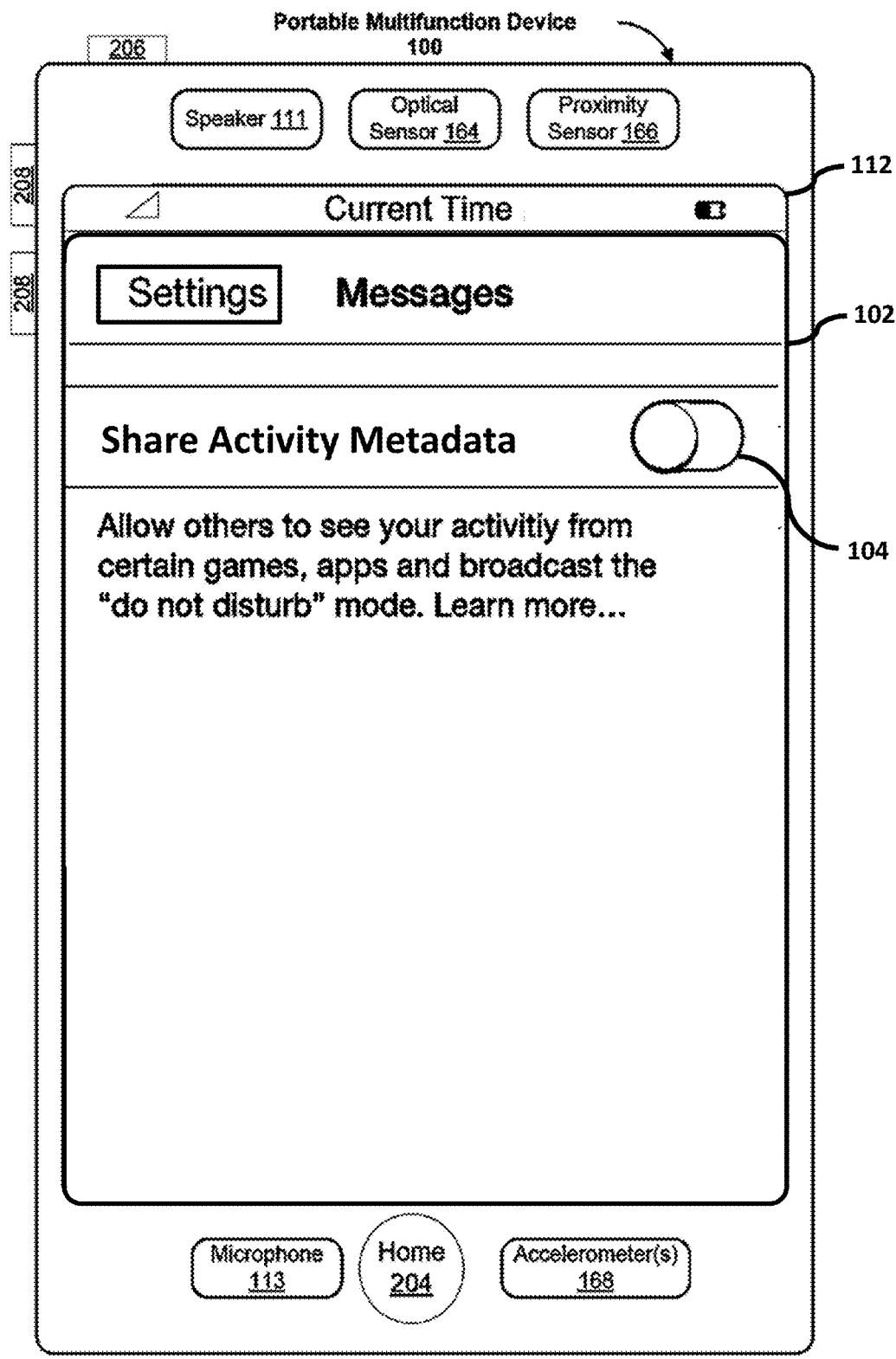
FIG. 1 illustrates an exemplary configuration screen on a portable multifunction device for activating an activity beacon feature in accordance with the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for facilitating content discovery among users in close relationships, such as friends, family members, or colleagues. In particular, the present technology is directed to systems, methods, and computer products that support the sharing of metadata among such users in a manner that allows these users to learn and gain access to content or applications associated with or identified by the metadata. In exemplary embodiments, this sharing of metadata is enabled by the presentation of user interface elements into the messaging client with augmented functionality.

As used herein, the term "messaging client" can refer to any application on an end user device supporting the exchange of messages between users. Although the present technology will be described primarily with respect to instant messaging clients on computing devices or text messaging clients on mobile phone (e.g., SMS, MMS), the present technology can be applied with respect clients and applications supporting any type of computer-mediated communications between two electronic devices, such as clients or application for e-mail, video, audio or text chat or conferencing, bulletin boards, list-servers, massively multiplayer online games, weblogs (blogs), rich rite summary (RSS) data, to name a few. Thus, the term "messaging session" can refer to an instance in which a user is part of with a messaging client or an application incorporating messaging client capabilities, including instances where other users associated with a communications are not actively engaged with their respective messaging clients.

Although the various embodiments will be described primarily with respect to a portable multifunction device, such as a tablet, mobile phone, smart phone, laptop computer, notebook computer, or netbook, the present technology is not limited in this regard. Rather, the present technology can be implemented for messaging clients associated with any type of networked computing device, including desktop computers or workstations, gaming consoles, and set-top boxes, to name a few.

In many conventional messaging clients, there are typically provided user interface elements that identify users associated with a messaging session. In some cases, such messaging clients may also provide user interface elements that indicate an availability status of such users. In the present technology, additional user interface elements are provided to indicate activities associated with the user based on metadata received from the device of such a user. These additional user interface elements are also configured to provide access to content or applications associated with such activities. For example, in a messaging client configured in accordance with the present technology, an icon can be provided next to the name of a first user associated with a messaging session. The icon can be configured to visually indicate an activity associated with the first user or to allow a second user associated with the messaging session to select the icon to present such information at their device. Moreover, the icon can be configured such that the selection of such an icon by the second user or further action with such an icon by the second initiates the process of providing the second user access to content or an application associated with the first user. The operation of this process is illustrated below with respect to FIGS. 1-7.

Turning first to FIG. 1, illustrates an exemplary configuration screen 102 on a portable multifunction device 100 for activating an activity metadata sharing feature in accordance with the present technology.

FIGS. 1-7 each illustrate a portable multifunction device 100 having a touch screen 112 in accordance with some embodiments. The touch screen may display one or more graphics within user interface (UI). In these exemplary embodiments, as well as others described below, a user may select one or more of the graphics by making contact or touching the graphics, for example, with one or more fingers (not shown). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. The menu button 204 may be used to navigate to any application that may be executed on the device 100. Alternatively, in some embodiments, the menu button is implemented as a soft key in a touch screen 112. As shown in FIGS. 1-7, the device 100 includes a speaker 111, a touch screen 112, a microphone 113, a menu button 204, a push button 206 for powering the device on/off and locking the device, and volume adjustment button(s) 208. In some configurations, device 100 can include an optical sensor 164, a proximity sensor 166, accelerometers 168, a Subscriber Identity Module (SIM) card slot (not shown), a head set jack (not shown), and a docking/charging external port (not shown), and at least transceiver (not show) for supporting communications over wireless or wireline networks. The push button 206 can be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Referring specifically to FIG. 1, a user may not wish to share activity metadata with at least some users on a global scale. Thus, a device 100 configured in accordance with the present technology can be configured to prevent such sharing. For example, as illustrated in FIG. 1, the device 100 can provide a configuration setting screen 102 that prevents any application from sharing activity metadata. Thus, a user can selectively enable the sharing by activating a selection element 104. Although element 104 is illustrated as a switch-type selection element, the present technology is not limited in this regard and any other type of selection element can be used in the various embodiments to make selections in this and other embodiments, such as push-buttons, drop-down lists, list boxes, combo boxes, check boxes, radio buttons, cycle buttons, or sliders, to name a few.

In some embodiments, the screen 102 can be configured to provide additional selection elements (not shown) associated with specific applications. Thus, a user can selectively activate activity metadata sharing on an application-by-application basis. Alternatively, screen 102 can also be configured to provide additional selection elements (not shown) associated with particular users or groups of users. Thus, a user can selectively activate activity metadata sharing on a user-by-user basis, a group-by-group basis, or a combination of both. In still another configuration, activity metadata sharing can be configured in accordance with an activity at the device 100 (e.g., currently in a call), an activity associated with the device 100 (e.g., currently in motion implying the user is driving, biking or running), a location of the device 100, a network connection for the device 100, or other information associated with the device 100. This can also be on an application or user basis as well. In some embodiments, the ability to activate activity metadata sharing for applications or users can be disabled if the selection 104 is not set to activate activity metadata sharing for the device 100.

Figure 2:
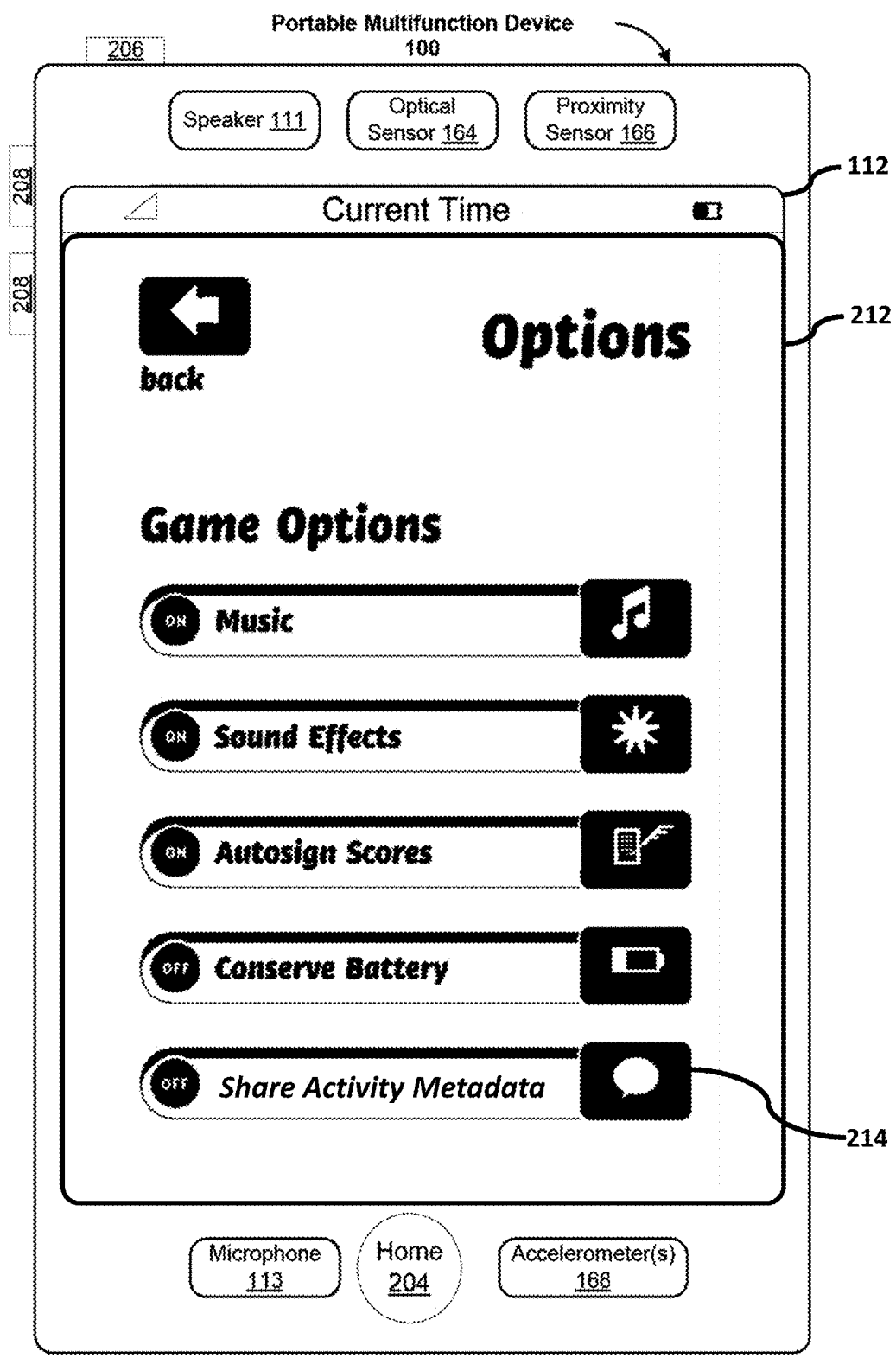
FIG. 2 illustrates an exemplary application configuration screen on a portable multifunction device for activating an activity beacon feature for the application in accordance with the present technology.

As noted above, activity metadata sharing can be activated on an application-by-application basis. In some configurations, this can be performed via the configuration screen 102 of FIG. 1. In other configurations, this functionality can be incorporated into an application itself. This is illustrated with respect to FIG. 2. FIG. 2 illustrates an exemplary application configuration screen 212 on a portable multifunction device 100 for activating an activity beacon feature within an application in accordance with the present technology.

As shown in FIG. 2, a configuration screen 212 of an application can be configured to include a selection element 214 to activate sharing of activity metadata for the application. Thus, a user can selectively enable the sharing by activating the selection element 214. Although element 214 is illustrated as a button-type selection element, the present technology is not limited in this regard and any other type of selection element can be used in the various embodiments to make selections in this and other embodiments, such as push-buttons, drop-down lists, list boxes, combo boxes, check boxes, radio buttons, cycle buttons, or sliders, to name a few.

As described above with respect to FIG. 1, screen 212 can be similarly configured to provide additional selection elements (not shown) associated with particular users or groups of users. Thus, a user can selectively activate activity metadata sharing on a user-by-user basis, a group-by-group basis, or a combination of both. In some embodiments, the ability to activate activity metadata sharing for the application or users can be disabled if activity metadata sharing is not activated for the device 100.

Now that some exemplary configurations for activating activity metadata sharing have been present, the present disclosure turns to FIGS. 3A-7 to illustrate the user interface elements resulting from the sharing of such activity metadata and how the user interface elements can be utilized to access content or applications associated with such activity metadata.

Figure 3A:
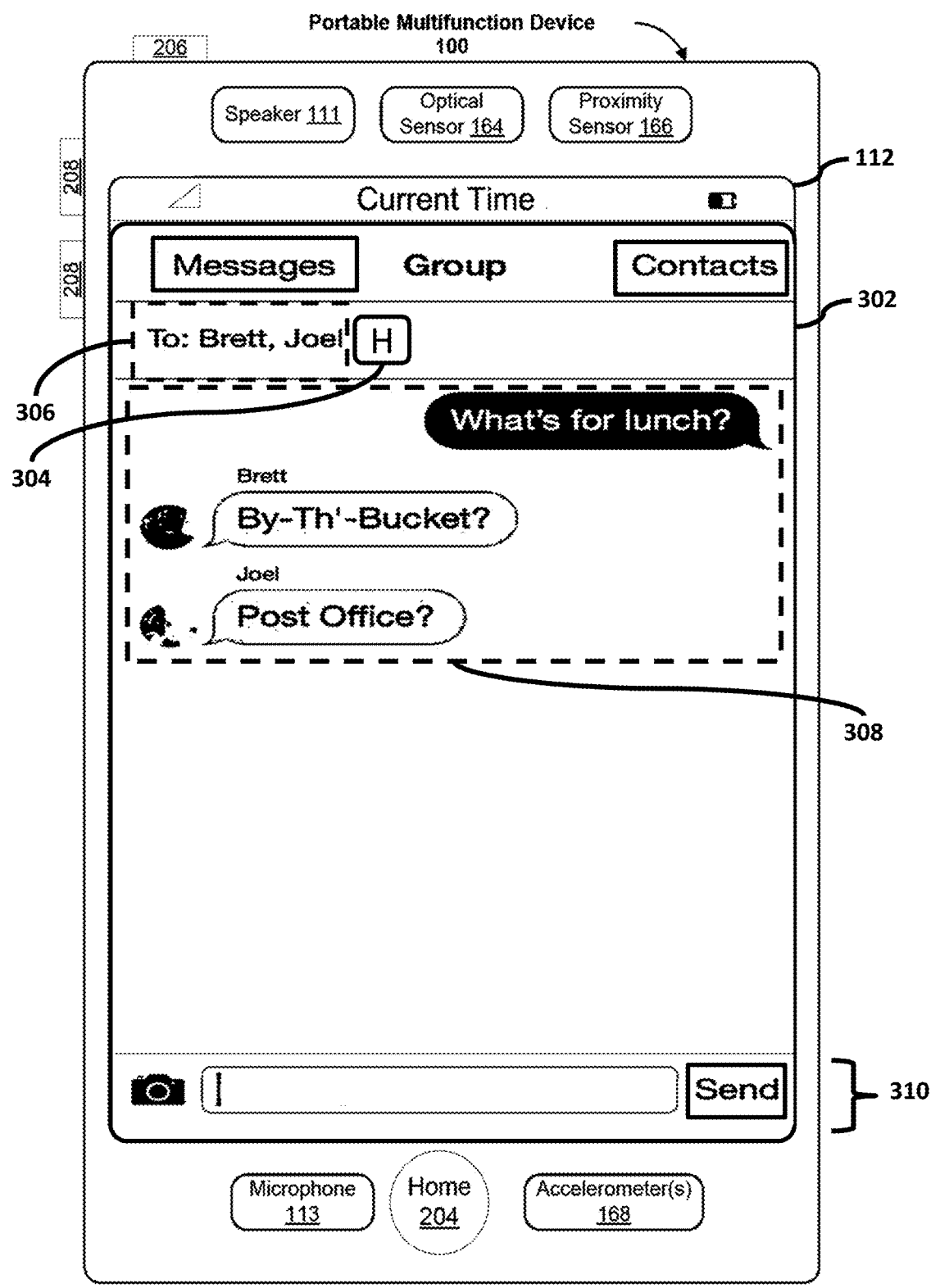
FIG. 3A illustrates an exemplary configuration of a messaging client on a portable multifunction device during a messaging session with a user interface element indicating a current gaming activity of another user in accordance with the present technology.

FIG. 3A illustrates an exemplary configuration of a messaging client screen 302 on a portable multifunction device 100 during a messaging session with a user interface element 304 indicating a current gaming activity of another user in accordance with the present technology. As shown in FIG. 3A, screen 302 shows the typical elements seen in a messaging client during a messaging session: the users associated with session 306, the messages from the users 308, and an input element 310 for creating messages.

In addition to such elements, screen 302 also includes an additional element 304 that indicates an activity associated with the user. As noted above, the element 304 can be configured to show that the user is engaged in a gaming activity. In particular, if the shared activity metadata indicates that a user is playing the game "hearts", the element 304 can be configured to visually indicate as much. Alternatively, if the activity metadata indicates that the user is playing a specific version or application, the element 304 can be configured to visually indicate as much. For example, the icon associated with the specific application can be inserted into screen 302 next to the name of the associated user, as shown in FIG. 3A by the inclusion of the "H" icon next to the name "Joel" corresponding to the icon associated with the application.

Figure 3B:
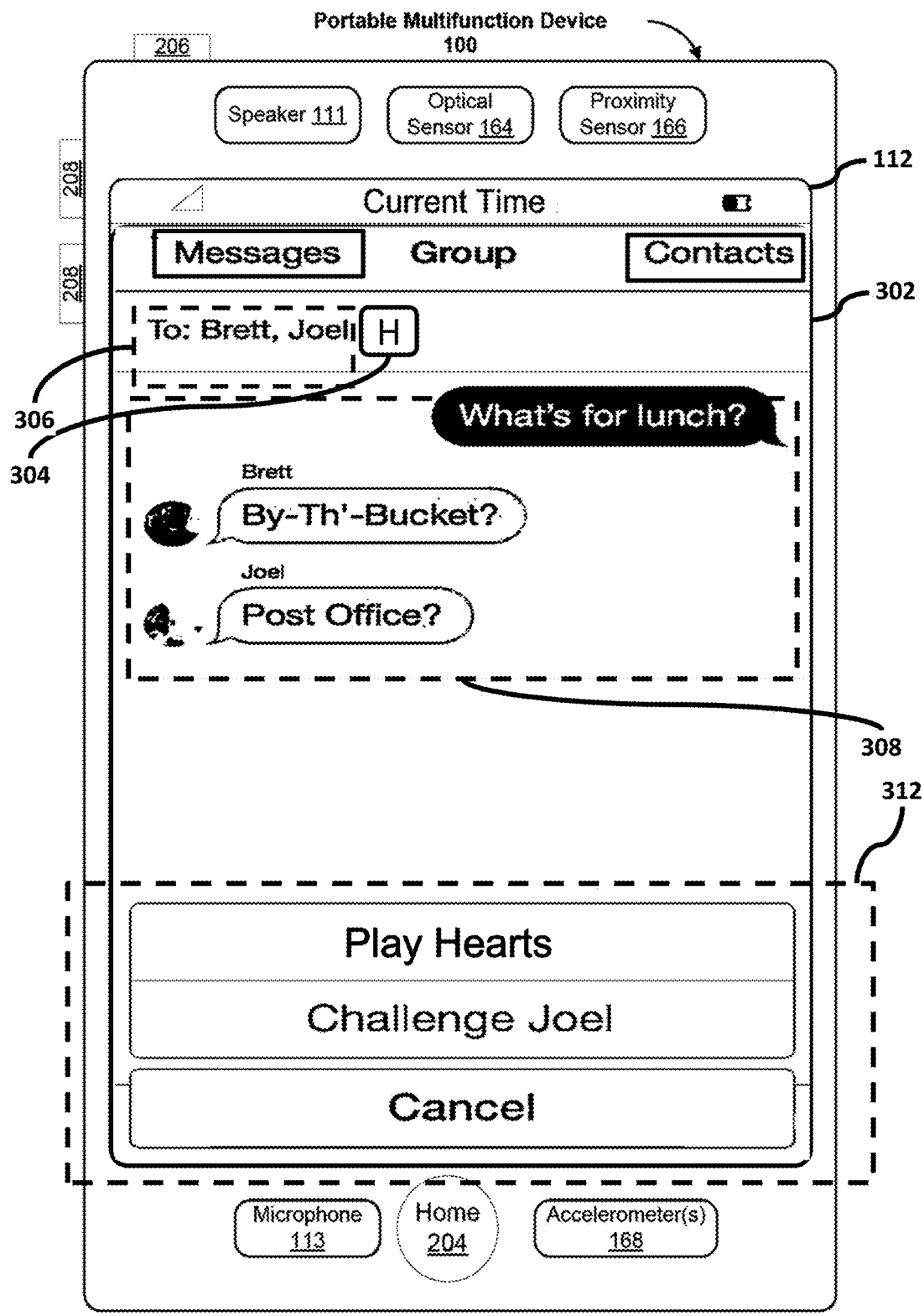
FIG. 3B illustrates an exemplary configuration of the messaging client of FIG. 3A in accordance with the present technology after a user selection of the user interface element.

As noted above, the element 304 is also configured to allow other users to view or access the application via selection or interaction with element 304. This is illustrated below with respect to FIG. 3B. FIG. 3B illustrates an exemplary configuration of the messaging client of FIG. 3A in accordance with the present technology after a user selection of the user interface element 304.

In FIG. 3B, the selection of interface element 304 results in the presentation of additional element 312. In particular, the additional elements 312 allow the user to play the game (button for "Play Hearts") if the device 100 currently has the game installed thereon. In cases, where the game is not installed, the additional elements 312 can include controls to begin downloading and installation of the game. For example, instead of a button for "Play Hearts", as shown in FIG. 3A, a button can be provided to install the game. In cases where the game allows interaction between users at different devices, the additional elements 312 can be configured to invite the other user to interact (button for "Challenge Joel"). In some configurations, additional elements can be provided to invite others to join the game. For example, a button can be provided to invite all users in the messaging session to join the game. Additionally, as shown in FIG. 3B, a "Cancel" button can be provided in user interface elements 312 to allow a user to return to the messaging session.

Although the embodiments in FIGS. 3A and 3B and other embodiments below illustrate that a user remains within a same screen or view, the present disclosure also contemplates that the selection of elements associated with shared activity metadata can cause the user to be taken to a different screen. Additionally, although only a limited number of options is provided in interface elements 312 (and similar elements in other embodiments), the present disclosure contemplates that more or less options than shown in the various figures can be provided in the various embodiments.

In some embodiments, the additional interface elements associated with shared activity metadata can be configured to indicate either current or past activity associated with a user. In the case of current activity, the additional interface elements can be configured as described above with respect to FIGS. 3A and 3B. In the case of past activity, the additional interface elements can be configured to convey such information. This is illustrated below with respect to FIGS. 4A and 4B.

Figure 4A:
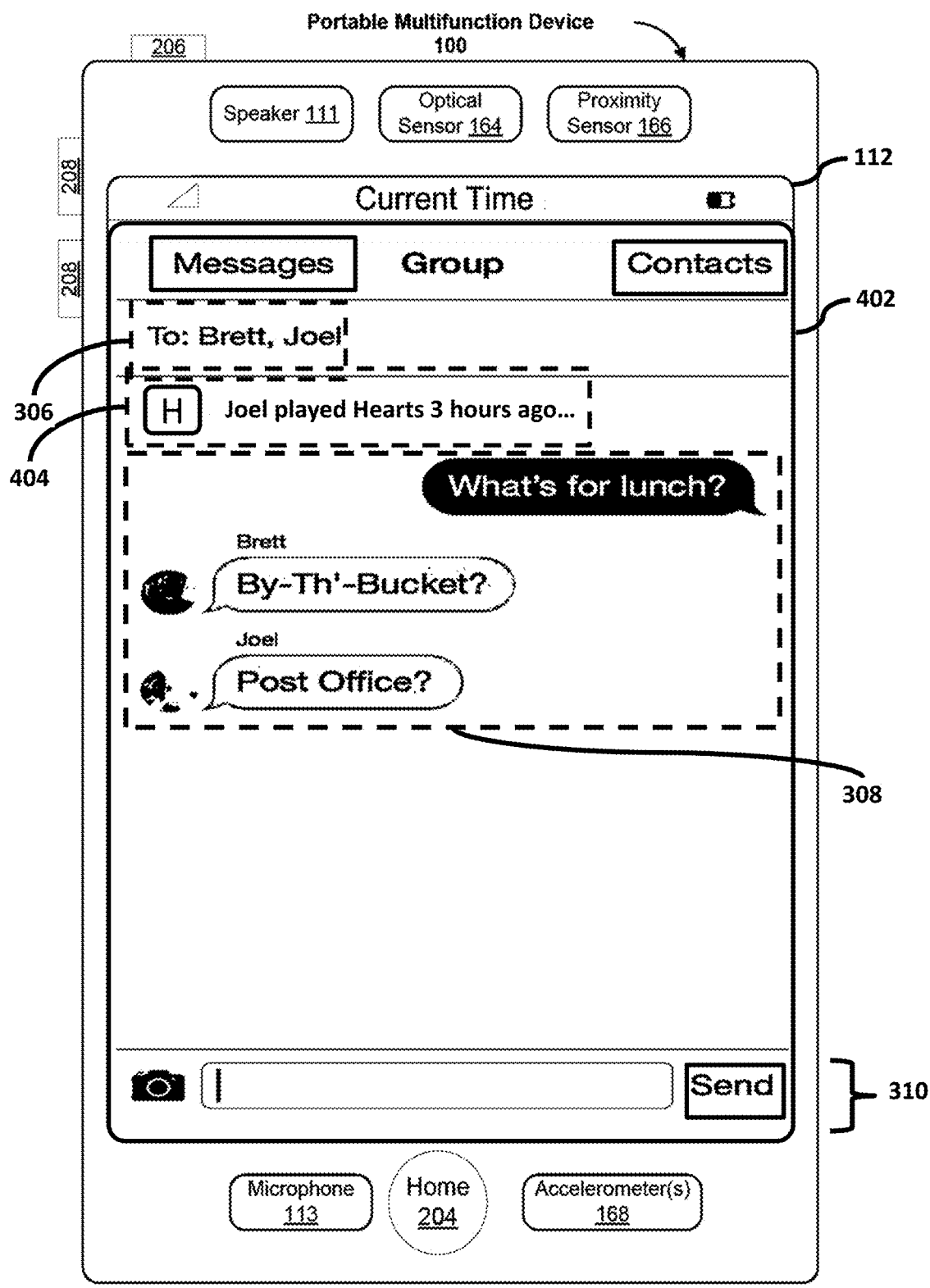
FIG. 4A illustrates an exemplary configuration of a messaging client on a portable multifunction device during a messaging session with a user interface element indicating a past gaming activity of another user in accordance with the present technology.
Figure 4B:
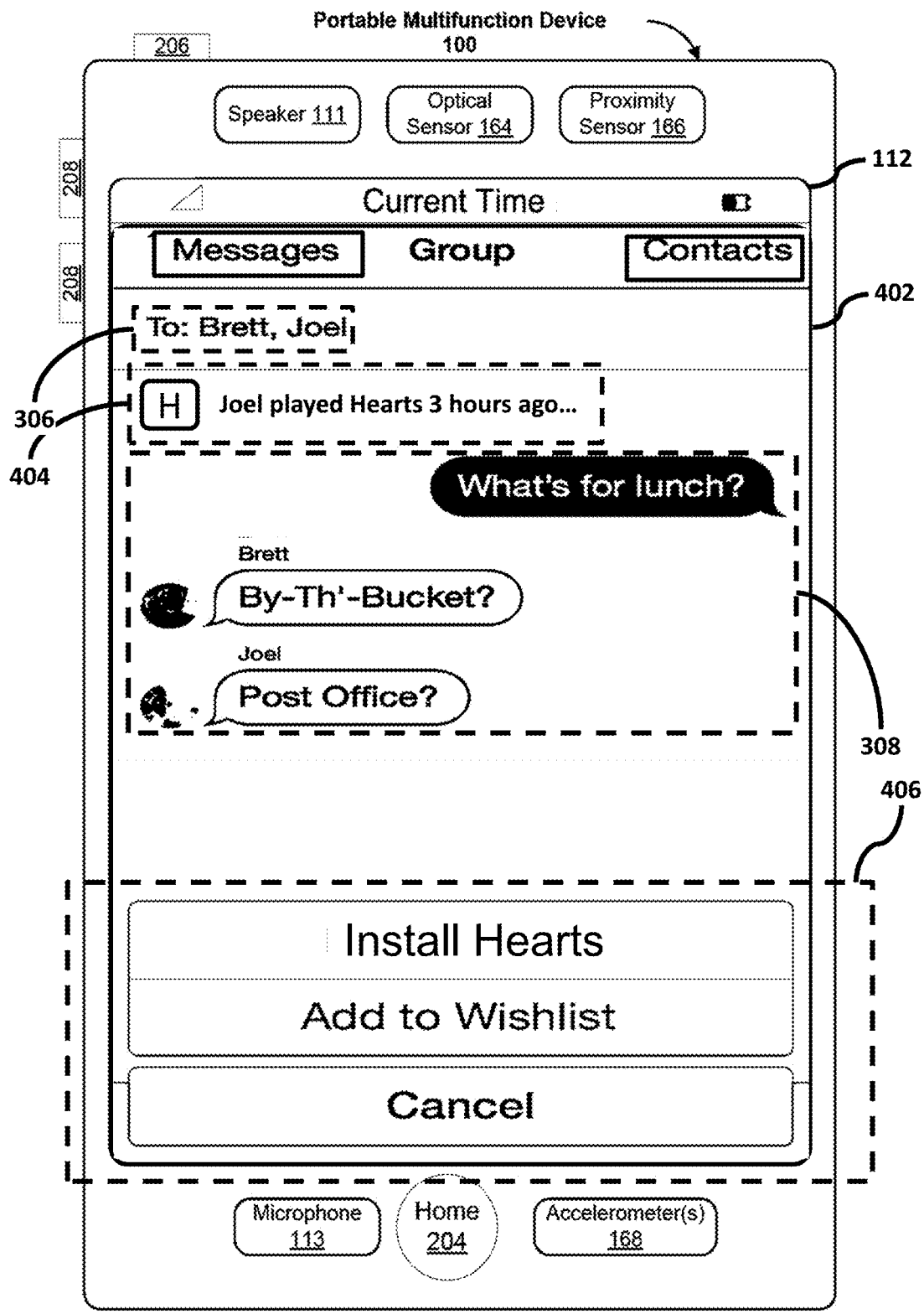
FIG. 4B illustrates an exemplary configuration of the messaging client of FIG. 4A in accordance with the present technology after a user selection of the user interface element.

FIG. 4A illustrates an exemplary configuration of screen 402 for a messaging client on a portable multifunction device during a messaging session with a user interface element 404 indicating a past gaming activity of another user in accordance with the present technology. FIG. 4B illustrates an exemplary configuration of the messaging client of FIG. 4A in accordance with the present technology after a user selection of the user interface element 404. As shown in FIGS. 4A and 4B, screen 402 includes many of the same elements as illustrated in FIGS. 3A and 3B. Accordingly, the description of these elements in FIGS. 3A and 3B is sufficient for describing these elements in FIGS. 4A and 4B.

As noted above, FIGS. 4A and 4B are directed to presenting an indication of past gaming activity. Accordingly, user interface element 404 is configured in this regard. In particular, the user interface element 404 can be configured to display not only an icon associated with the game, as previously described above with respect to FIG. 3A, but can also include additional information. For example, as shown in FIG. 4A, a notation can be provided in element 404 indicating the time elapsed since the user was playing the game ("Joel played Hearts 3 hours ago . . . "). As shown in FIG. 4A, this can be shown along with the messages 308. Alternatively, a separate portion of screen 402 can be dedicated to display the element 404 in a persistent or temporary fashion.

Upon selection by the user of the interface element 404, the additional elements 406 can be displayed in a similar fashion as the additional elements 312 in FIG. 3B. In the case of FIG. 4B, it is assumed that the game "Hearts" is not installed on device 100. Accordingly, the additional elements 312 provide buttons for installing the game ("Install Hearts"), for adding the game to a wishlist for later review and installation ("Add to Wishlist"), or for returning to the session. The wishlist can be part of another application (e.g., a wishlist in an application store) or a wishlist incorporated into the messaging client. The entries for the wishlist can be saved as links to allow the user to invoke the application required to download and install the game application. In the case where the game was installed, additional elements 312 could be configured as described above with respect to FIG. 3B. That is, to play the game or invite other users in the session to play the game.

In an alternative embodiment, rather than placing element 404 in a separate location from the list of users 306, the element 404 can be configured substantially similar to element 304 in FIG. 3A. That is, an icon can be placed next to a name. In some cases, the additional elements 406 can be configured to convey the notation information. Alternatively, to provide an immediate visual indication, the icon can be altered to indicate that the user is not currently playing the game. (e.g., grayed out, recolored, overlapping mark, etc.). Thereafter, the notation can be accessed by selecting the altered element and accessing the additional elements 406 to access the notation information.

As discussed above, the interface elements of the present technology are not limited to indicating an application a user is currently engaged with and allow others access to the application, but also to allow other users to access a same content in such applications. For example, an article, a webpage, a media file (audio, video, and/or image), or a streaming media source (audio and/or video), to name a few. This is illustrated below with respect to FIGS. 5A and 5B.

Figure 5A:
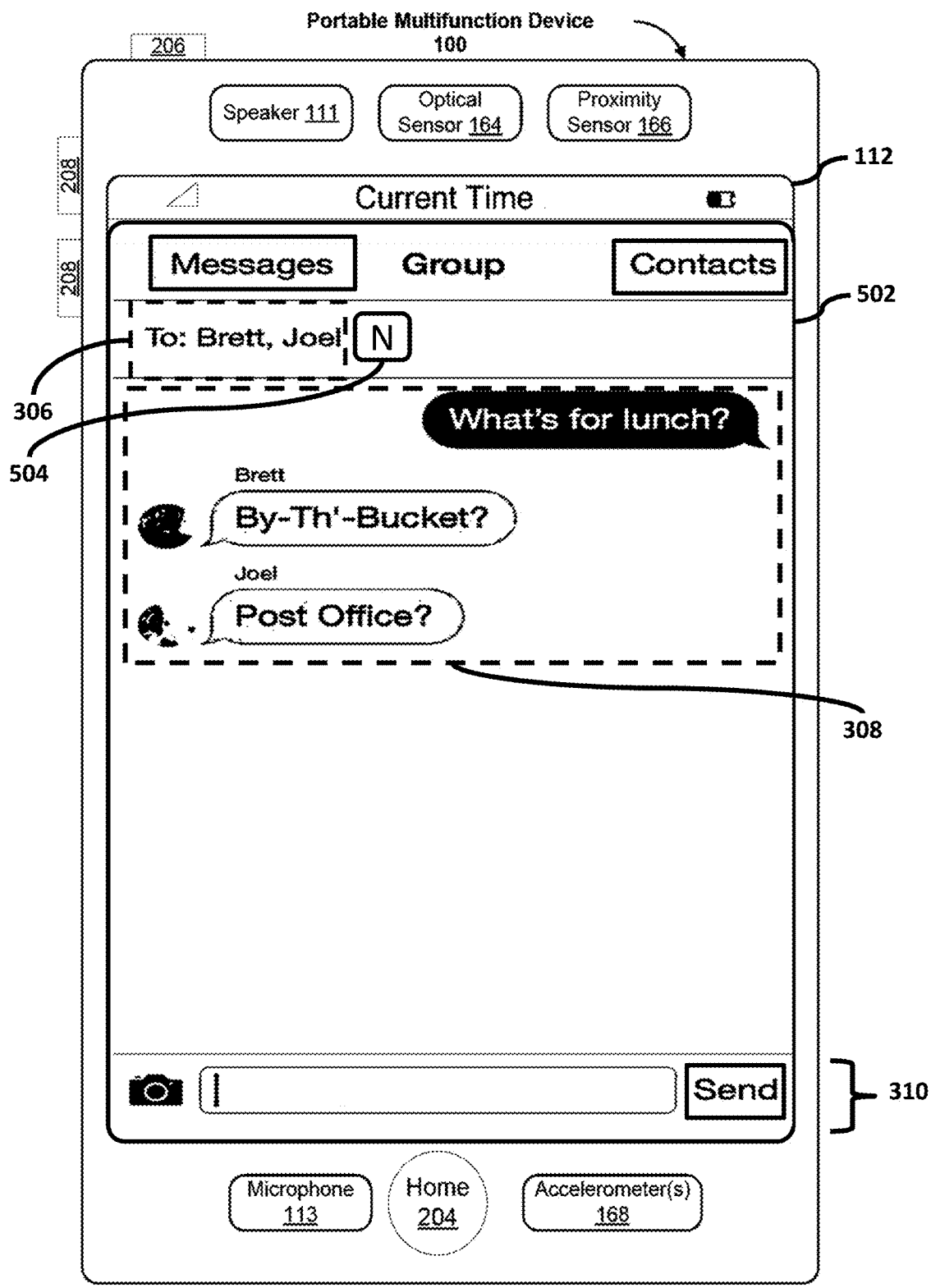
FIG. 5A illustrates an exemplary configuration of a messaging client on a portable multifunction device during a messaging session with a user interface element indicating a current news reading activity of another user in accordance with the present technology.
Figure 5B:
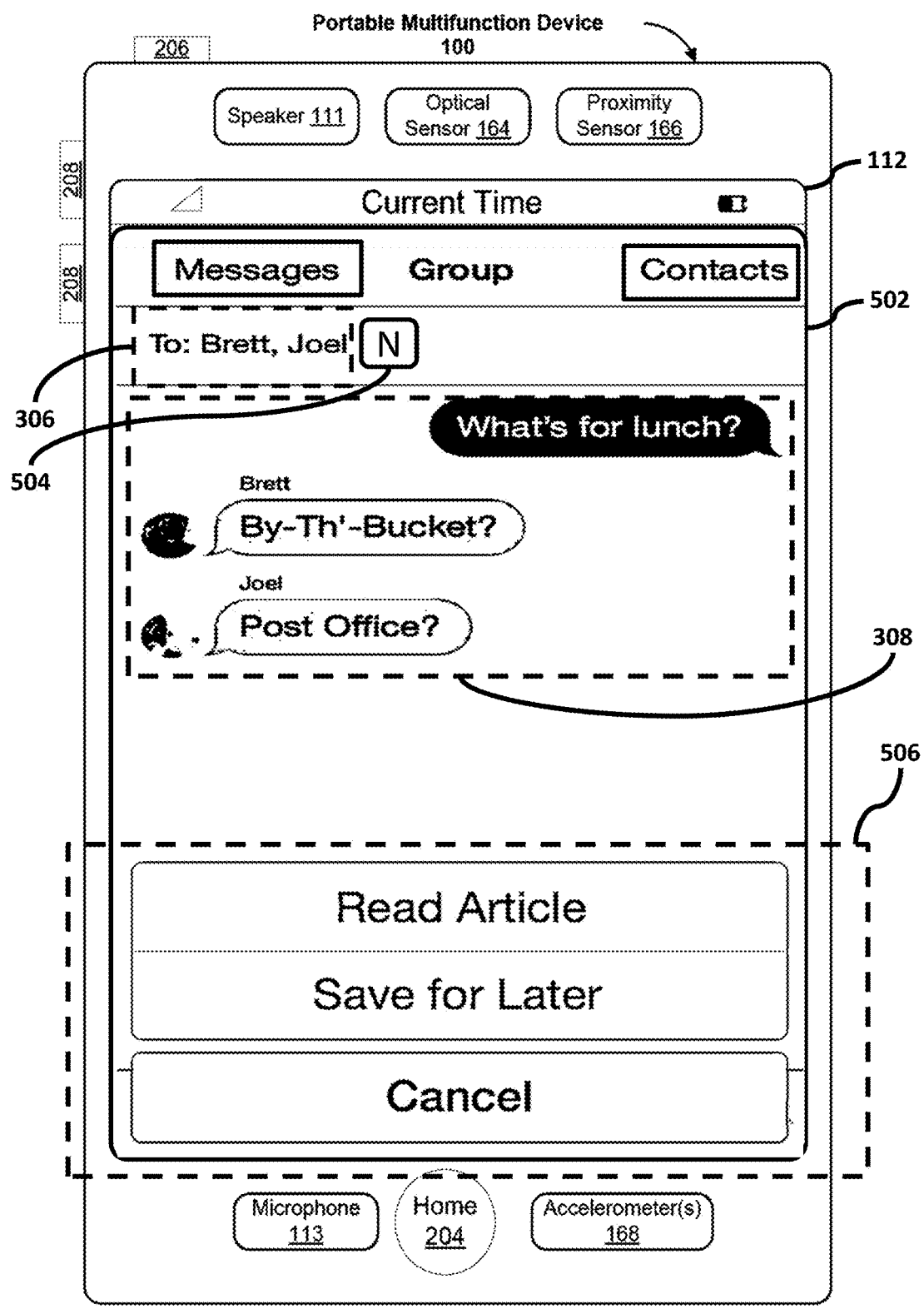
FIG. 5B illustrates an exemplary configuration of the messaging client of FIG. 5A in accordance with the present technology after a user selection of the user interface element.

FIG. 5A illustrates an exemplary configuration of a screen 502 for messaging client on a portable multifunction device 100 during a messaging session with a user interface element 504 indicating a current news reading activity of another user in accordance with the present technology. FIG. 5B illustrates an exemplary configuration of the messaging client of FIG. 5A in accordance with the present technology after a user selection of the user interface element 504. As shown in FIGS. 5A and 5B, screen 502 includes many of the same elements as illustrated in FIGS. 3A and 3B. Accordingly, the description of these elements in FIGS. 3A and 3B is sufficient for describing these elements in FIGS. 5A and 5B.

As shown in FIG. 5A, screen 502 also includes an additional element 504 that indicates an activity associated with the user. As noted above, the element 504 can be configured to show that the user is engaged in accessing particular content. In particular, if the shared activity metadata indicates that a user is viewing a news webpage of listening or viewing media content, the element 504 can be configured to visually indicate as much. Alternatively, if the activity metadata indicates that the user is viewing the content using a specific application, the element 504 can be configured to visually indicate as much. For example, the icon associated with the specific application can be inserted into screen 502 next to the name of the associated user, as shown in FIG. 3A by the inclusion of the "N" icon next to the name "Joel" corresponding to the icon associated with the application for the new content.

As noted above, the element 504 is also configured to allow other users to view or access the application via selection or interaction with element 504. This is illustrated below with respect to FIG. 5B.

In FIG. 5B, the selection of interface element 504 results in the presentation of additional elements 506. In particular, the additional elements 506 allow the user to read the same article (button for "Read Article"). If the device 100 currently has the same application for accessing the content, the content can be opened in that application. Otherwise, the content can be opened in another compatible application. In some configurations, the additional elements 506 can be configured to allow the user to select the application in which the content is to be opened. Additionally, as shown in FIG. 5B, the user can elect to save the content for later access. The saved content can be saved as links to allow the user to invoke the application required to access the content later. This link can be saved in another application, sent as a message to the user, or saved as part of the messaging session. Finally, as shown in FIG. 5B, a "Cancel" button can be provided in additional elements 506 to allow a user to return to the messaging session.

In some embodiments, the additional interface elements associated with shared activity metadata can be configured to indicate either current or past content accessed by a user. In the case of current content, the additional interface elements can be configured as described above with respect to FIGS. 5A and 5B. In the case of past content, the additional interface elements can be configured to convey such information in a manner substantially similar to that shown in FIGS. 4A and 4B.

In addition to providing access to content or applications, the present technology is also useful for providing status information to avoid communications with persons who are unavailable or unwilling to engage in a messaging session. This is illustrated below with respect to FIGS. 6A and 6B.

Figure 6A:
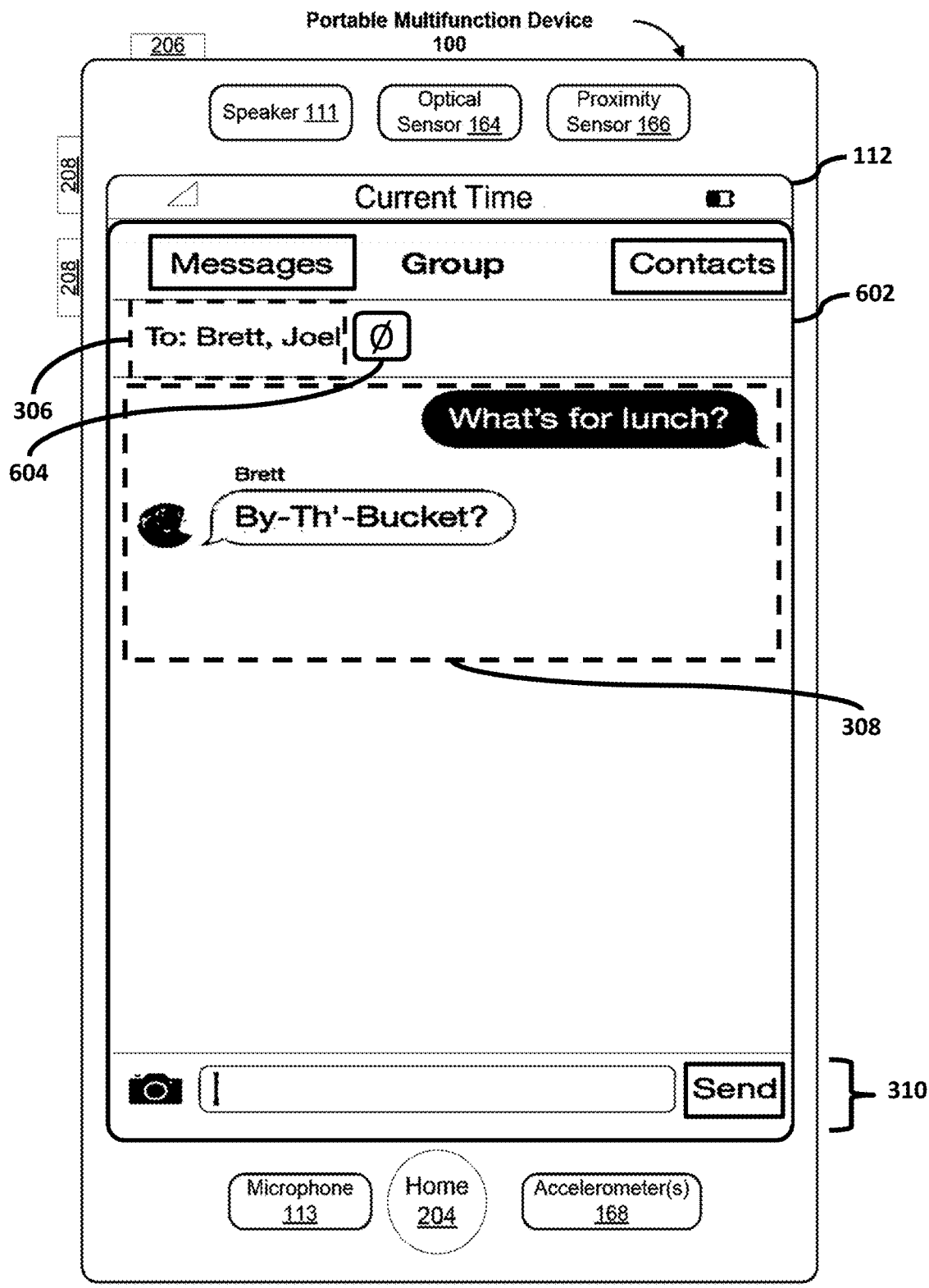
FIG. 6A illustrates an exemplary configuration of a messaging client on a portable multifunction device during a messaging session with a user interface element indicating an unavailability of another user in accordance with the present technology.
Figure 6B:
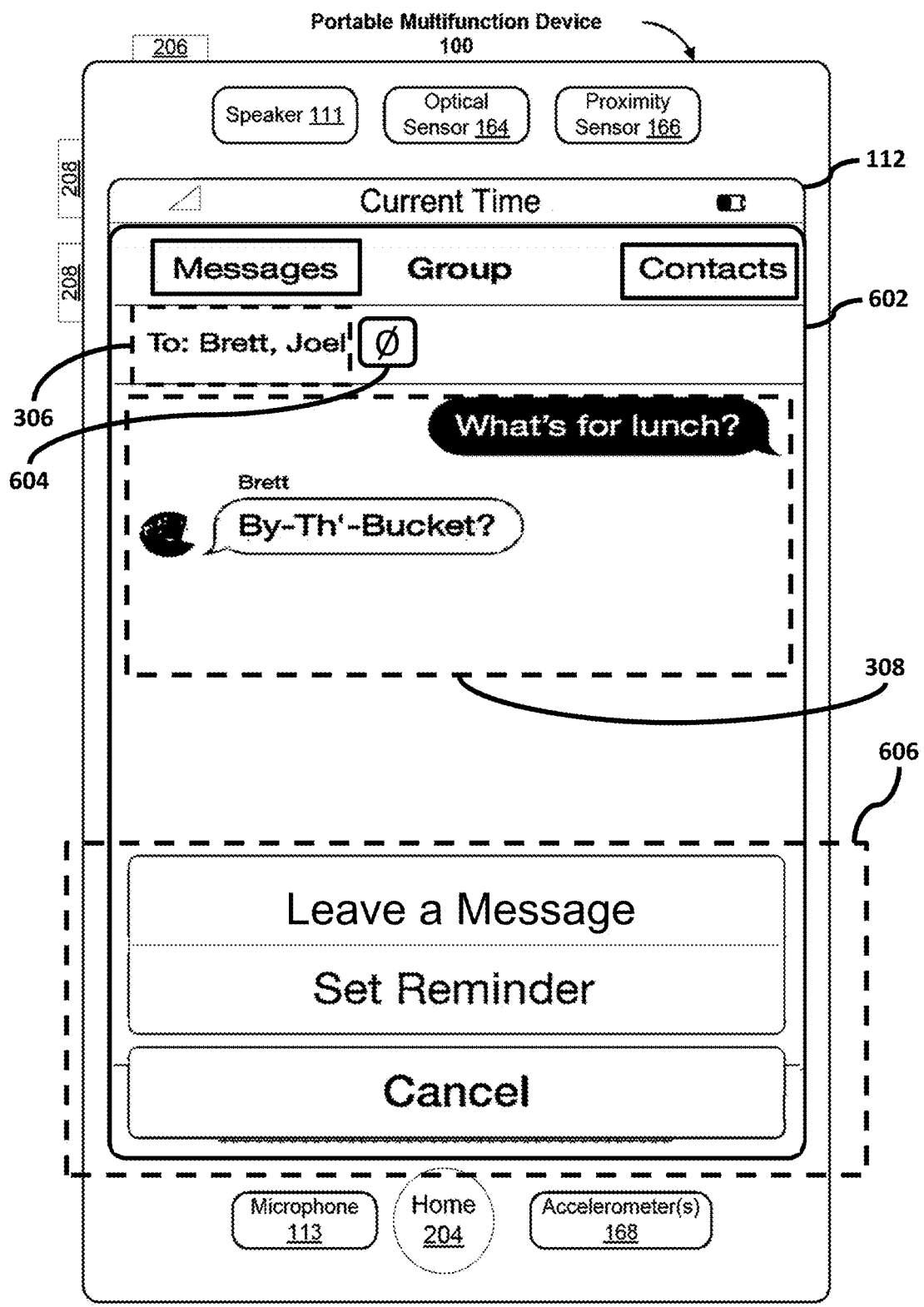
FIG. 6B illustrates an exemplary configuration of the messaging client of FIG. 6A in accordance with the present technology after a user selection of the user interface element.

FIG. 6A illustrates an exemplary configuration of a screen 602 for a messaging client on a portable multifunction device during a messaging session with a user interface element 604 indicating an unavailability of another user in accordance with the present technology. FIG. 6B illustrates an exemplary configuration of the messaging client of FIG. 6A in accordance with the present technology after a user selection of the user interface element 604. As shown in FIGS. 6A and 6B, screen 602 includes many of the same elements as illustrated in FIGS. 3A and 3B. Accordingly, the description of these elements in FIGS. 3A and 3B is sufficient for describing these elements in FIGS. 6A and 6B.

In some instances, shared activity metadata for a user may indicate that the user is unavailable for a messaging session for several reasons. For example, a user may be engaged in a telephone call, in a meeting, driving, exercising, etc. In such circumstances, the element 604 can be configured to show that the user is unavailable by configuring the icon associated with the user to present a symbol of unavailability. For example, as shown in FIG. 3A, the "Ø" icon can be included next to the name "Joel" to indicate that this user is not available for a messaging session.

However, in addition to showing a status, the element 604 is also configured to allow other users to take actions with respect to the unavailable user. This is illustrated below with respect to FIG. 6B. As shown in FIG. 6B, the selection of the user interface element 604 can cause the presentation of additional elements 606. In particular, the additional elements 606 allow the user to leave a message for the unavailable user (via e-mail, voice, etc.) or set a reminder to engage with the unavailable user at a later time. Finally, as shown in FIG. 6B, a "Cancel" button can be provided in additional elements 506 to allow a user to return to the messaging session.

Although FIGS. 3A-6B illustrates a particular configuration and placement for elements in a messaging client. The various embodiments are not limited to any particular arrangement. Thus, in other embodiments, alternate arrangements can be provided. One alternate arrangement is shown in FIG. 7.

Figure 7:
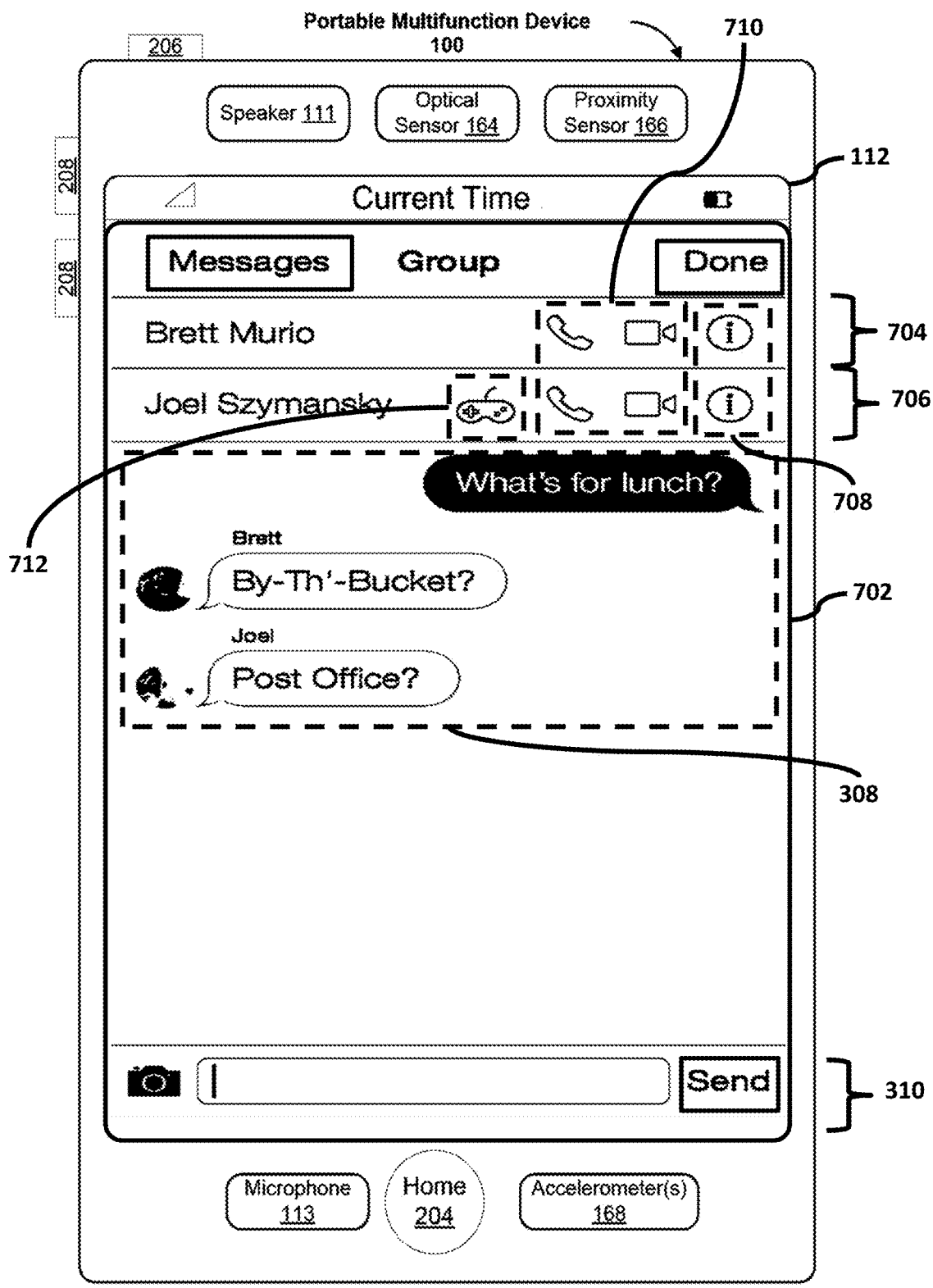
FIG. 7 illustrates an exemplary alternate configuration of a messaging client on a portable multifunction device during a messaging session with a user interface elements indicating current gaming activities and other information for other users in accordance with the present technology.

FIG. 7 illustrates an exemplary alternate configuration of a messaging client on a portable multifunction device 100 during a messaging session with a user interface elements indicating current gaming activities and other information for other users in accordance with the present technology. As shown in FIGS. 7A and 7B, screen 702 includes many of the same elements as illustrated in FIGS. 3A and 3B. Accordingly, the description of these elements in FIGS. 3A and 3B is sufficient for describing these elements in FIGS. 7A and 7B.

As shown in FIG. 7, rather than the simple listing of users shown in FIGS. 3A-6B, the screen 702 can include entries 704, 706 for each user for the messaging session. In each of entries 704 and 706, elements can be provided to show status and activity information. For example, as shown in FIG. 7, each of entries 704 and 706 can be associated with elements 710 that show alternate ways to contact users. These elements can be active to allow the mode of communications to be invoked directly from screen 702. Further, each of entries 704 and 706 can be associated with elements 708 that provide access to additional information. These elements can also be active to allow a user to access a phonebook or other information regarding the user. Finally, Further, each of entries 704 and 706 can be associated with elements 712 that are associated with shared activity metadata. For example, as illustrated in FIG. 7, when a user is playing a game, a corresponding element 712 can show a game icon. In some configurations, the icon can be generic to provide solely status information. However, in other configurations, the icon can be specific and identify the particular game. In such configurations, this icon can operate as described above with respect to FIGS. 3A-5B.

Figure 8A:
FIGS. 8A and 8B illustrate potential options that can be presented to a user in a messaging client in response to the selection of a user interface element in a messaging client configured in accordance with the present technology.
Figure 8B:
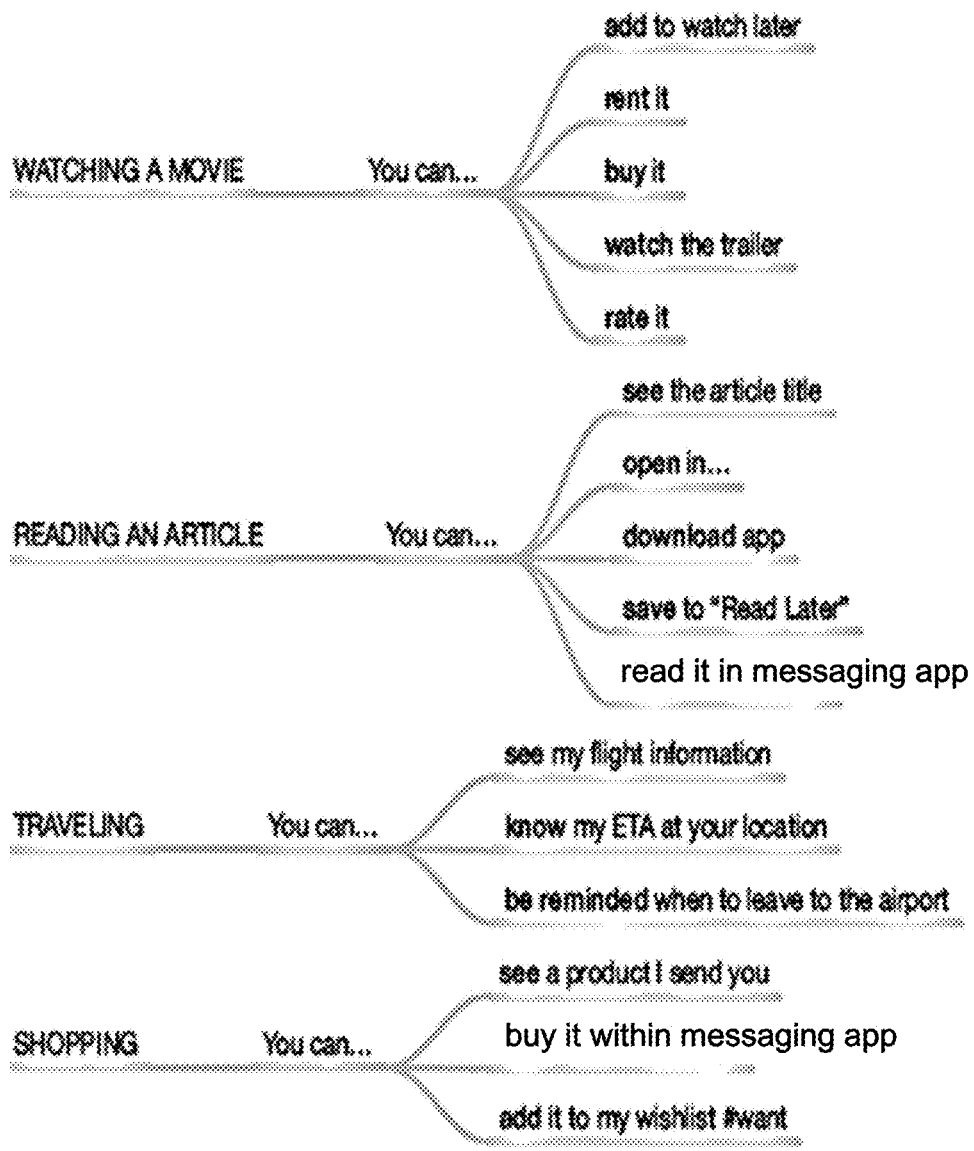

As noted above, when an interface element associated with shared activity metadata for a first user is selected, the options presented to a second user can vary based on the activity the associated with first user. Some of these options are illustrated in FIGS. 8A and 8B. FIGS. 8A and 8B illustrate potential options that can be presented to a user in a messaging client in response to the selection of a user interface element in a messaging client configured in accordance with the present technology. As shown in FIGS. 8A and 8B, for each activity associated with a user, a different set of options can be presented. For example, if a user is running, the options can be to show a running path in real-time or live, show an estimate of the user's ETA to a destination, or the user's vitals. Similarly, different sets of options can be presented for other types of activities. In some configurations, all options can be presented. However, less than all options can be presented in other configurations for various reasons. For example, a user can limit the types of activity metadata being shared. Thus, corresponding options are not presented. In another example, some of the options may be irrelevant with respect to the activity metadata being shared. Accordingly, such options may not be presented. Other criteria can be specified to determine, based on the activity metadata being shared, which of the options are presented to other user.

As noted above, it may be desirable for publishers of content and application to leverage the preference that users typically have towards opinions of friends, family, colleagues, or any other persons in a close relationship. Accordingly, while users have the opportunity to opt out of sharing activity metadata with other users, publishers can provide incentives to encourage users to do so. That is, since the publication of an icon associated with a content or an application can be considered an advertisement for the content or application, the user sharing the related activity metadata can be rewarded. For example, if a first user's shared activity metadata leads to a second user downloading an application or purchasing an application, the publisher can reward the user by providing credits towards other applications and in-application purchases. Similarly, if a first user's shared activity metadata leads to a second user accessing a publisher's content, the publisher can reward the user by providing credits towards accessing the publisher's pay walled content. However, the present technology is not limited in this regard and other schemes for encouraging user participation can be provided in the various embodiments.

Now that the end user experience has been described in some detail, the present disclosure turns to a discussion of systems and methods for providing this experience. First, the disclosure turns to FIG. 9, which illustrates an exemplary system supporting messaging services in accordance with the various embodiments.

Figure 9:
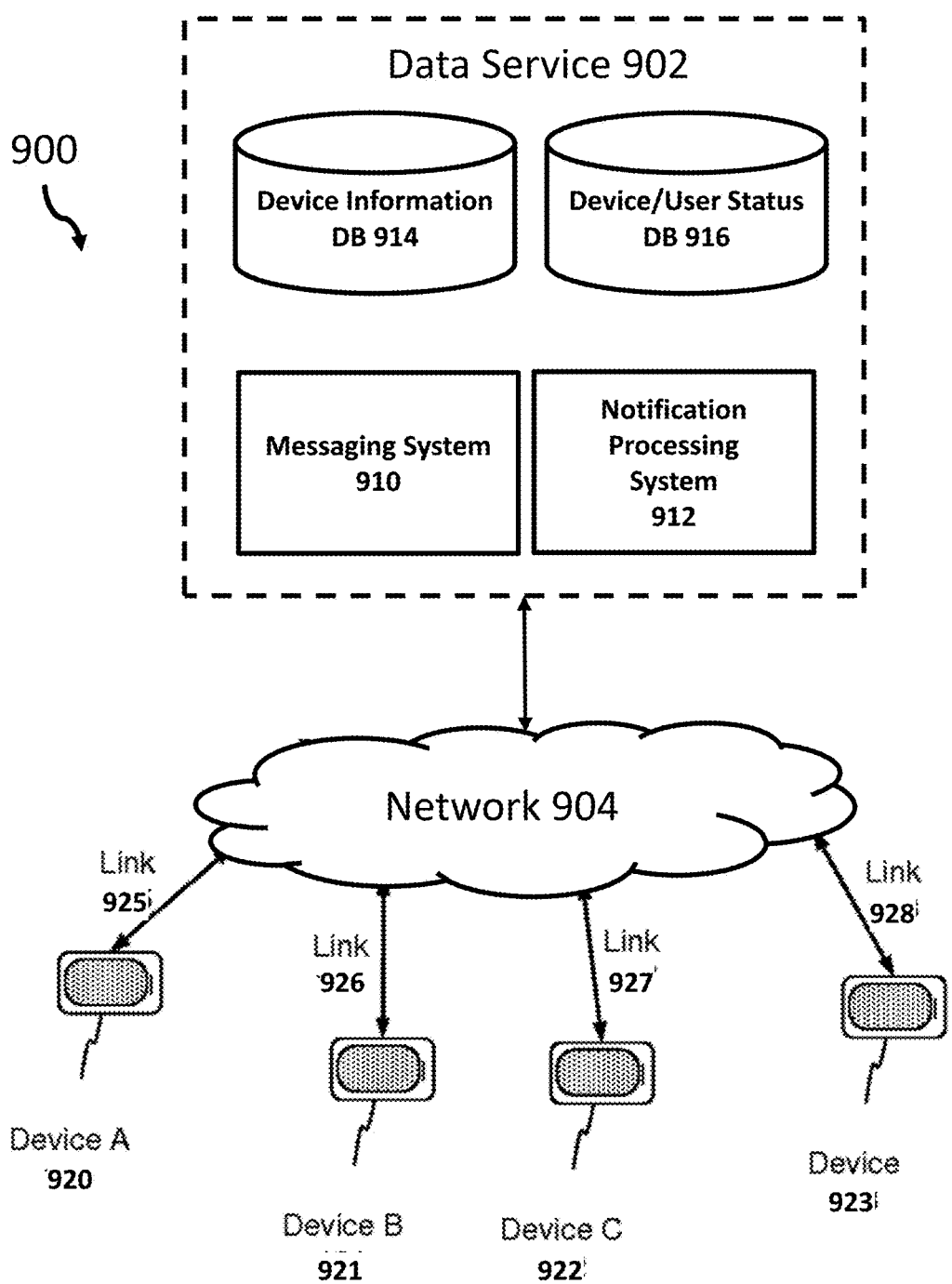
FIG. 9 illustrates an exemplary system supporting messaging services in accordance with the various embodiments.

As illustrated in FIG. 9, a general network topology implemented in one embodiment of the invention can include a group of "client" or "peer" computing devices A-D, 920-923, respectively, communicating with one another and with one or more data services 902 over a network 904. Although illustrated as a single network in FIG. 9, the "network" 904 can include a variety of different components including public networks such as the Internet and private networks such as local Wi-Fi networks (e.g., 802.11n home wireless networks or wireless hotspots), local area Ethernet networks, cellular data networks (e.g., 3G, Edge, etc.), and WiMAX networks, to name a few. For example, device A 920 may be connected to a home Wi-Fi network represented by network link 925, device B 921 may be connected to a 3G network (e.g., Universal Mobile Telecommunications System ("UMTS"), High-Speed Uplink Packet Access ("HSUPA"), etc.) represented by network link 926, device C 922 may be connected to a WiMAX network represented by network link 927, and device 923 may be connected to a public Wi-Fi network represented by network link 928. Each of the local network links 925-928 over which the devices 920-923 are connected may be coupled to a public network such as the Internet through a gateway and/or NAT device (not shown in FIG. 9), thereby enabling communication between the various devices 920-923 over the public network. However, if two devices are on the same local or private network (e.g., the same Wi-Fi network), then the two devices may communicate directly over that local/private network, bypassing the public network. It should be noted, of course, that the underlying principles of the invention are not limited to any particular set of network types or network topologies.

Each of the devices 920-923 illustrated in FIG. 9 can communicate with a messaging system 910 and a notification processing system 912 of data service 902. In one embodiment, the systems 910 and 912 can be implemented as software executed across one or more physical computing devices such as servers. As shown in FIG. 9, in one embodiment, the systems 910 and 912 are implemented within the context of a larger data service 90200 managed by the same entity (e.g., the same data service provider) and accessible by each of the devices 920-923 over the network 904. The data service 900 can include a local area network (e.g., an Ethernet-based LAN) connecting various types of servers and databases. The data service 900 may also include one or more storage area networks ("SANs") for storing data. In one embodiment, the databases store and manage data related to each of the devices 920-923 and the users of those devices (e.g., user account data, device account data, user application data . . . etc.).

In operation for messaging, a first of devices 920-923 initiates a messaging session. For example, in a text messaging or instant messaging scenario, a user at device A 920 selects other users (recipients) for the session, inputs, a message, and causes their device to send the message. The message is then received at messaging system 910 in data service 902. The messaging system 910 then resolves a network address for the recipients and forwards the message to the corresponding network address. The devices associated with such network addresses (e.g., devices 921-923) can then receive and present the message in their respective messaging clients.

Concurrently or contemporaneously with the messaging process described above, the devices 920-923 can also interact with notification processing system 912 to share and collect activity metadata. For example, based on the configuration for sharing activity metadata at device A 920, device A 920 can assemble notification messages for notification processing system 912. The notifications can also include preference information for sharing status information. Such messages can be generated according to a schedule, in response to certain events at the device, on-demand by the user, or according to any other criteria. At notification processing system 912, the status (i.e., activity, content, and/or application) of device A 920 and the associated user can be discerned from the shared activity data contained the notification messages and stored for future use. For example, information and sharing preferences can be stored at device/user status database 916, along with timestamp information for the notification. Similarly, notifications can be received and processed for devices 921-923.

Thereafter, in response to initiating the messaging session, the messaging system 910 can interact with the notification processing system 912 to forward status data to the devices associated with the messaging session. This status information can be assembled by the notification processing system based on information and sharing preferences can be stored at device/user status database 916 and information stored in a device information database 914.

While the information and sharing preferences can be stored at device/user status database 916 specifies what can be shared, the information stored in device information database 914 specifies if the information that can be shared can be used by the devices in the messaging session. In a configuration where all devices have similar or equivalent capabilities, the same information can be provided. However, in configurations where the capabilities of the devices vary, the notification processing system 912 can tailor the status information for each device. Alternatively, the status information can be tailored so that all devices receive the same information.

Accordingly, the notification processing system can access a device information database 914 to determine the capabilities of the various devices. Although such a database can indicate the hardware and software capabilities of devices, it can also be used to store other information that can affect the performance of a device, such as network type, network speed, etc. Once the status information is assembled for the devices, the status information is forwarded as a notification for the devices.

Figure 10:
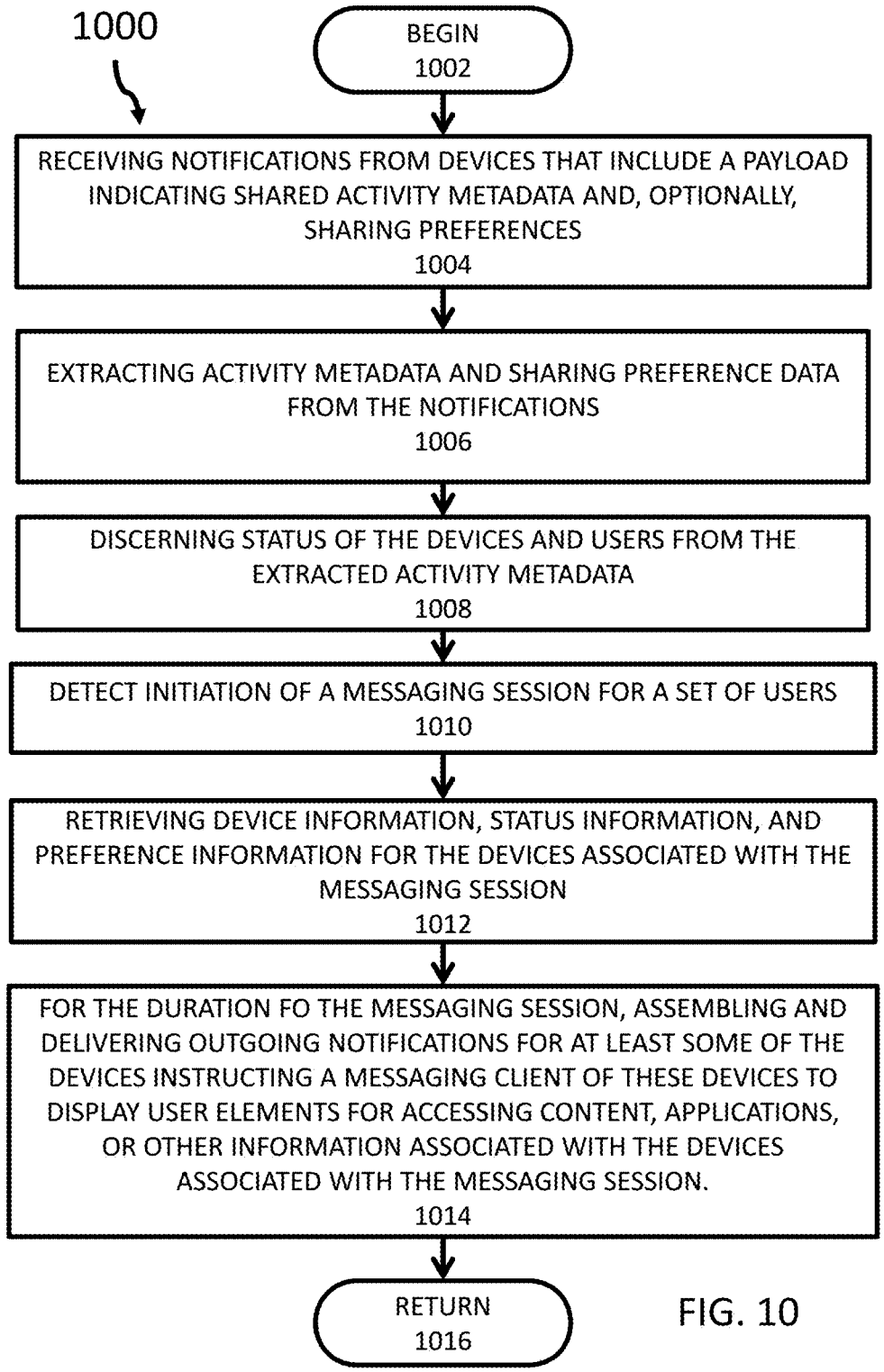
FIG. 10 is a flowchart of steps in an exemplary method at a data service supporting messaging services in accordance with the present technology.

FIG. 10 is a flowchart of steps in an exemplary method 1000 at a data service supporting messaging services in accordance with the present technology. Method 1000 begins at step 1002 and proceeds to step 1004. At step 1004, notifications are received from devices. For example, as discussed above, notifications from device 920-923 are received at notification processing system 912. These notifications can include a payload with activity metadata that is being shared for these devices. Optionally, the payload can also specify preferences for sharing with other users. Alternatively, the preferences can be communicated to the notification processing system 912 via a separate notification.

At step 1006, the activity metadata and the sharing preferences can be extracted from the notifications. Thereafter, at step 1008, a status of the device and/or the user can be discerned from the activity metadata. For example, the activity metadata may indicate that the device and/or user are engaged in one of the activities shown in FIGS. 8A and 8B. Step 1008 can also encompass storing the activity information at database 916.

At step 1010, the initiation of a messaging session can be detected. This can involve the messaging system 910 sending a notification or message to notification processing system 912 regarding the messaging session, including an identification of the users associated with the messaging session. Thereafter, at step 1012, information for the messaging session participants can be retrieved, including device information, status information, and preference information.

Once the information is retrieved at step 1012, and for the duration of the messaging session, notification can be sent to the devices associated with the session at step 1014. This step can encompass reviewing the device information, status information, and preference information to determine what information can be shared with which users and whether the devices involved limit the information to be shared with some or all users. Based on the review, the information can be assembled as a payload for a notification to the devices, where the payload provides instructions for a messaging client. In particular, the instructions specify to the receiving device what user interface elements to present.

In the case where the activity data is old or stale, the notifications at step 1014 can be configured to reflect as much. For example, as discussed above, a time elapsed can be included. Alternatively, if the time elapsed exceeds a pre-defined time, the notification can be configured to exclude the user interface elements altogether. In still another example, one can identify a portion of the timestamps falling within a pre-defined time window and thereafter configuring the instructions in the payload based on the portion of the activity information associated with the identified portion of the timestamps. Specifically, to include only user elements for activities falling within the time window.

In the various embodiments, the notifications assembled and delivered at step 1014 can be provided on a scheduled basis, on-demand by a user at a device, or in response to certain events. For example, a change in status at one device can cause notifications to be automatically assembled and delivered. In another example, a change in status may only be reflected when a user sends a message. In still another example, the frequency of updating can depend on various factors, such as network capabilities or device capabilities.

At step 1016, the data service can resume previous processing, including repeating method 1000.

Figure 11:
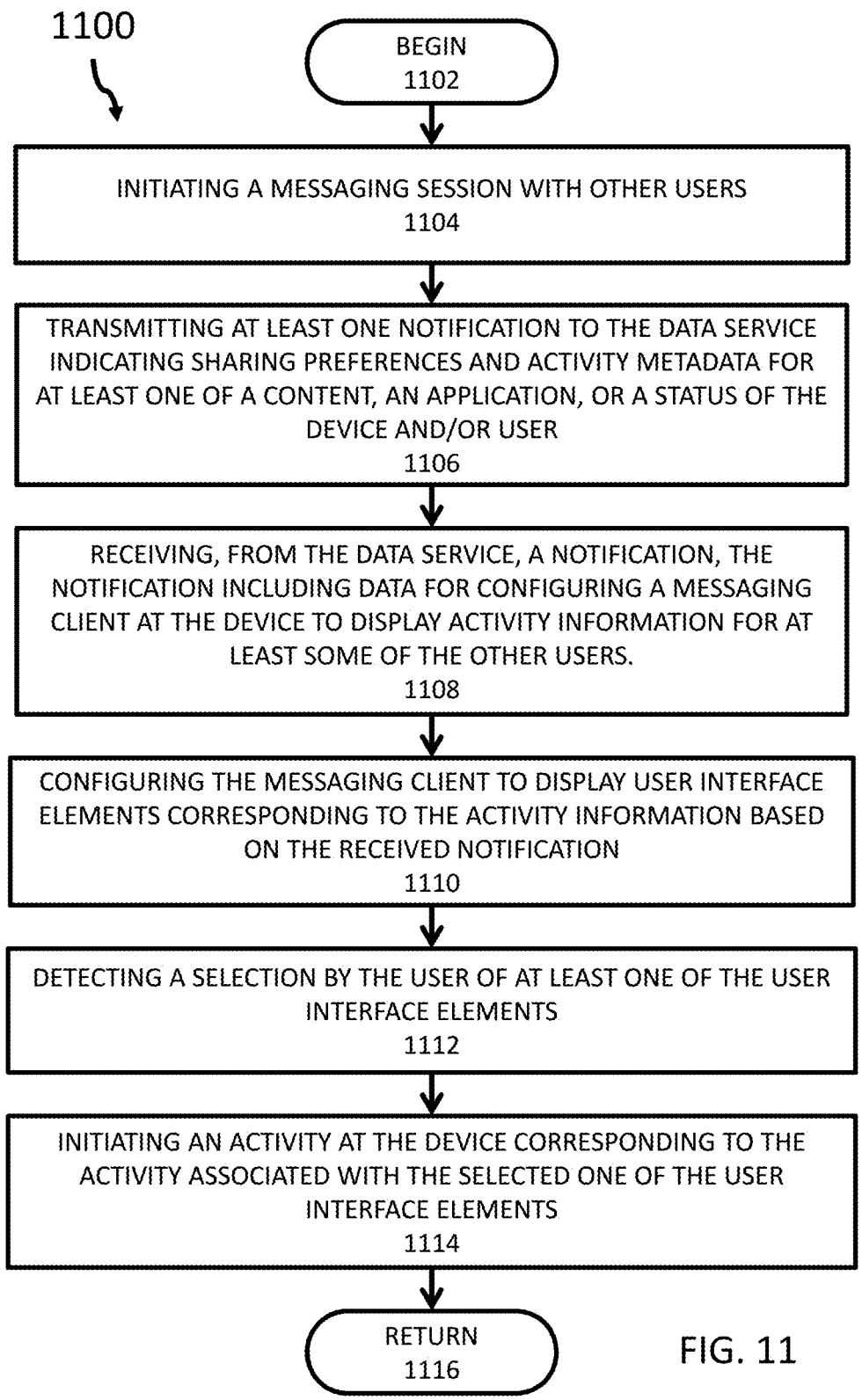
FIG. 11 is a flowchart of steps in an exemplary method at a messaging client configured in accordance with the present technology.

FIG. 11 is a flowchart of steps in an exemplary method 1100 at a messaging client configured in accordance with the present technology. Method 1100 begins at step 1102 and continues to step 1104. At step 1104, a messaging client begins a messaging session at a user device. As described above this can encompass the transmission of a message to other users from a user device.

Concurrently or contemporaneously with step 1104, step 1106 can be performed. At step 1106, the user device transmits one or more notifications to a data service. As noted above, these notifications can include payloads that specify sharing preferences and can also specify activity metadata indicating content, an application, or a status associated with the device or the user. Optionally, a timestamp associated with the activity metadata can also be included in such payloads.

In response to the initiating of the messaging session at step 1104, notifications regarding other devices can be received at step 1108. In particular, the notification can specify how to configure the messaging client in order to present activity information for other users. For example, the notifications can specify that certain users should have an associated icon and what user interface elements should be used. Further, the notifications can supply a link that allows the user to access the content or application associated with such other users when the user interface elements are selected. Thereafter at step 1110, the messaging client can be configured in accordance with the notifications received at step 1108.

At step 1112, a selection by the user of one of the user interface elements is detected. Thereafter, at step 1114, an activity can be initiated at the device that corresponds to the activity associated with the selected interface element. This step can encompass directly invoking an application or directly accessing content. Alternatively, this step can encompass, as illustrated above, generating additional user interface elements to allow the user to select the action to be taken. In some embodiments, the notification can specify which actions are allowed. In other embodiments, any valid actions can be presented. In still other embodiments, a list of actions can be provided by the notification and the user device can reduce the actions based on a current status or capabilities of the user device. For example, in the case of poor network connectivity, network intensive tasks, such as streaming media or downloading of large files, can be limited. Finally, at step 1116, the method 1100 can resume previous processing, including repeating method 1100.

Figure 12A:
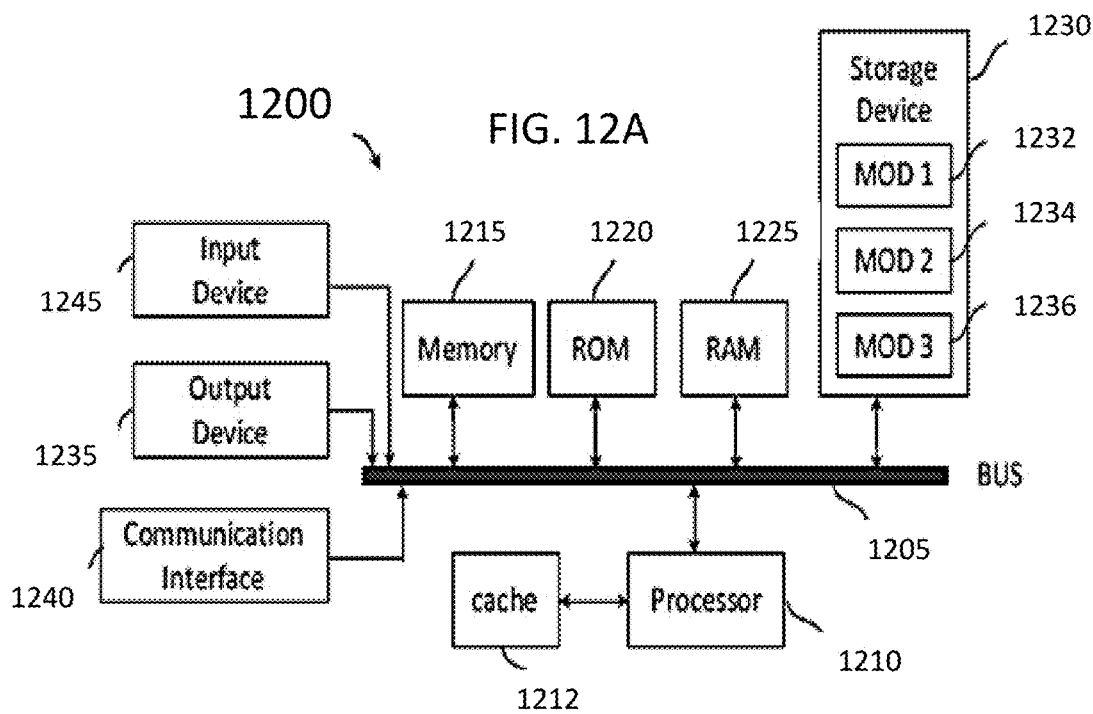
FIGS. 12A and 12B illustrate exemplary possible system embodiments for one or more devices configured in accordance with the present technology.
Figure 12B:
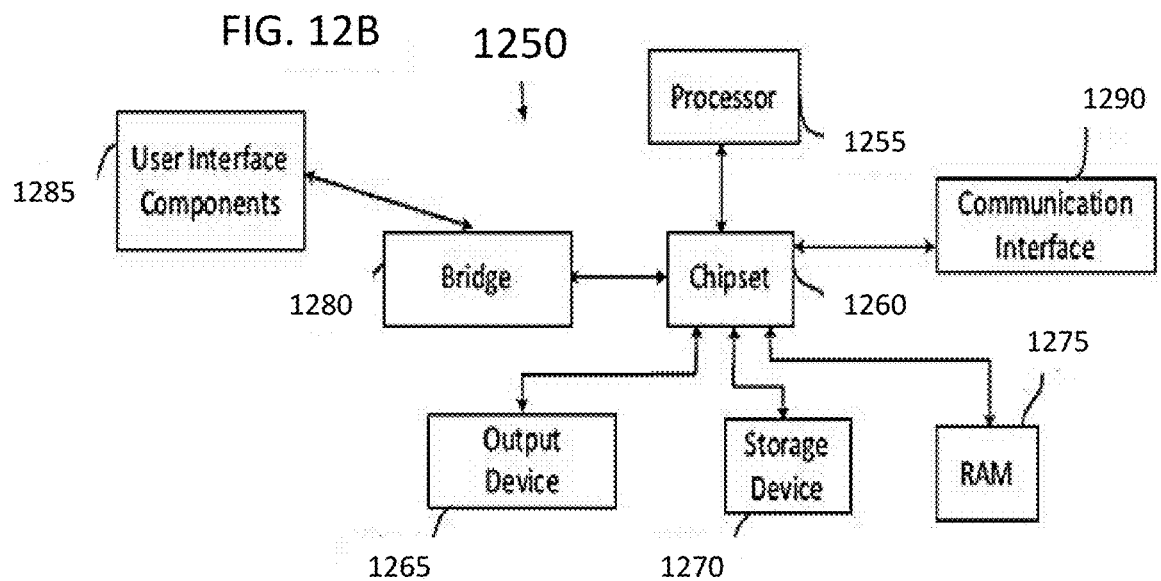

FIG. 12A, and FIG. 12B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 12A illustrates a conventional system bus computing system architecture 1200 wherein the components of the system are in electrical communication with each other using a bus 1205. Exemplary system 1200 includes a processing unit (CPU or processor) 1210 and a system bus 1205 that couples various system components including the system memory 1215, such as read only memory (ROM) 1220 and random access memory (RAM) 1225, to the processor 1210. The system 1200 can include a cache of high-speed memory connected directly with, in close proximity to, or integrated as part of the processor 1210. The system 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other system memory 1215 may be available for use as well. The memory 1215 can include multiple different types of memory with different performance characteristics. The processor 1210 can include any general purpose processor and a hardware module or software module, such as module 1 1232, module 2 1234, and module 3 1236 stored in storage device 1230, configured to control the processor 1210 as well as a special-purpose processor where software instructions are incorporated into the actual processor design. The processor 1210 may essentially be a completely self-contained computing system, containing multiple cores or processors, a bus, memory controller, cache, etc. A multi-core processor may be symmetric or asymmetric.

To enable user interaction with the computing device 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art. In some instances, multimodal systems can enable a user to provide multiple types of input to communicate with the computing device 1200. The communications interface 1240 can generally govern and manage the user input and system output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof.

The storage device 1230 can include software modules 1232, 1234, 1236 for controlling the processor 1210. Other hardware or software modules are contemplated. The storage device 1230 can be connected to the system bus 1205. In one aspect, a hardware module that performs a particular function can include the software component stored in a computer-readable medium in connection with the necessary hardware components, such as the processor 1210, bus 1205, display 1235, and so forth, to carry out the function.

FIG. 12B illustrates a computer system 1250 having a chipset architecture that can be used in executing the described method and generating and displaying a graphical user interface (GUI). Computer system 1250 is an example of computer hardware, software, and firmware that can be used to implement the disclosed technology. System 1250 can include a processor 1255, representative of any number of physically and/or logically distinct resources capable of executing software, firmware, and hardware configured to perform identified computations. Processor 1255 can communicate with a chipset 1260 that can control input to and output from processor 1255. In this example, chipset 1260 outputs information to output 1265, such as a display, and can read and write information to storage device 1270, which can include magnetic media, and solid state media, for example. Chipset 1260 can also read data from and write data to RAM 1275. A bridge 1280 for interfacing with a variety of user interface components 1285 can be provided for interfacing with chipset 1260. Such user interface components 1285 can include a keyboard, a microphone, touch detection and processing circuitry, a pointing device, such as a mouse, and so on. In general, inputs to system 1250 can come from any of a variety of sources, machine generated and/or human generated.

Chipset 1260 can also interface with one or more communication interfaces 1290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1255 analyzing data stored in storage 1270 or 1275. Further, the machine can receive inputs from a user via user interface components 1285 and execute appropriate functions, such as browsing functions by interpreting these inputs using processor 1255.

It can be appreciated that exemplary systems 1200 and 1250 can have more than one processor 1210 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
   determining, by one or more servers, that a first client device and a second client device are engaged in a messaging session that causes display of a messaging client user interface at the first client device and the second client device;
   receiving, during the messaging session, activity metadata from the first client device, wherein the activity metadata identifies a past activity a user engaged in at the first client device that occurred prior to the messaging session and is associated with a different application from the messaging session at the first client device;
   based on the activity metadata, generating a notification for the second client device, the notification being associated with the past activity; and
   transmitting, to the second client device, the notification with an instruction configured to trigger the second client device to present, during the messaging session and within the messaging client user interface, a user interface element associated with the past activity,
   wherein activating the user interface element at the second client device causes display of a second user interface element that when activated initiates obtaining the different application associated with the past activity for execution on the second client device.

2. The computer-implemented method of claim 1, further comprising:
   determining, by the one or more servers, whether the first client device is authorized to share activity metadata to the second client device according to a configuration setting stored on the first client device; and
   receiving, during the messaging session and based on a determination that the first client device is authorized to share the activity metadata to the second client device, the activity metadata from the first client device.

3. The computer-implemented method of claim 1, wherein the messaging client user interface includes messaging activity between the first client device and the second client device without activating the different application, and wherein the second user interface element is indicative of an option to install the different application on the second client device.

4. The computer-implemented method of claim 1, wherein the second user interface element is indicative of an option to invoke a link that allows for downloading and installing the different application on the second client device.

5. The computer-implemented method of claim 1, wherein the second user interface element is indicative of an option to invoke a link that allows for accessing the different application on the second client device.

6. The computer-implemented method of claim 1, wherein the notification comprises time elapsed information of when the user previously engaged in the past activity, and wherein the instruction is configured to trigger the second client device to present the time elapsed information associated with the past activity with the user interface element.

7. The computer-implemented method of claim 1, further comprising:
   determining respective device capabilities of the first client device and the second client device; and
   based on the respective device capabilities, determining one or more common capabilities between the first client device and the second client device; and
   wherein the notification is generated based on the one or more common capabilities between the first client device and the second client device.

8. The computer-implemented method of claim 1, wherein the messaging client user interface comprises a selectable prompt for initiating an interactive session with the first client device via a different mode of communication.

9. The computer-implemented method of claim 1, wherein the messaging client user interface comprises a selectable prompt for providing access to additional information for a user entry.

10. The computer-implemented method of claim 9, further comprising:
    determining whether the different application is not installed at the second client device;
    wherein generating the notification comprises configuring the instruction to trigger the second client device to present the second user interface element when the different application is not installed at the second client device.

11. A system comprising:
    one or more processors; and
    at least one computer-readable storage medium storing instructions which, when executed by the one or more processors, cause the system to:
       determine that a first client device and a second client device are engaged in a messaging session that causes display of a messaging client user interface at the first client device and the second client device;
       receive, during the messaging session, activity metadata from the first client device, wherein the activity metadata identifies a past activity a user engaged in at the first client device that occurred prior to the messaging session and is associated with a different application from the messaging session at the first client device;
       based on the activity metadata, generate a notification for the second client device, the notification being associated with the past activity; and
       send, to the second client device, the notification with an instruction configured to trigger the second client device to present, during the messaging session and within the messaging client user interface, a user interface element associated with the past activity,
       wherein activating the user interface element at the second client device causes display of a second user interface element that when activated initiates obtaining the different application associated with the past activity for execution on the second client device.

12. The system of claim 11, wherein the messaging client user interface includes messaging activity between the first client device and the second client device without activating the different application, and wherein the second user interface element is indicative of an option to install the different application on the second client device.

13. The system of claim 11, wherein the second user interface element is indicative of an option to invoke a link that allows for downloading and installing the different application on the second client device.

14. The system of claim 11, wherein the instructions, when executed by the one or more processors, further cause the system to:
    determine whether the first client device is authorized to share activity metadata to the second client device according to a configuration setting stored on the first client device; and
    receive, during the messaging session and based on a determination that the first client device is authorized to share the activity metadata to the second client device, the activity metadata from the first client device.

15. The system of claim 11, wherein the notification comprises time elapsed information of when the user previously engaged in the past activity, and wherein the instruction is configured to trigger the second client device to present the time elapsed information with the user interface element within the messaging client user interface.

16. At least one non-transitory computer-readable storage medium comprising:
    instructions stored thereon which, when executed by one or more processors, cause the one or more processors to:
       determine that a first client device and a second client device are engaged in a messaging session that causes display of a messaging client user interface at the first client device and the second client device;
       receive, during the messaging session, activity metadata from the first client device, wherein the activity metadata identifies a past activity a user engaged in at the first client device that occurred prior to the messaging session and is associated with a different application from the respective client messaging application at the first client device;
       based on the activity metadata, generate a notification for the second client device, the notification being associated with the past activity; and
       send, to the second client device, the notification with an instruction to present, during the messaging session and within the messaging client user interface, a user interface element associated with the past activity,
       wherein activating the user interface element at the second client device causes display of a second user interface element configured to initiate obtaining the different application associated with the past activity for execution on the second client device.

17. The at least one non-transitory computer-readable storage medium of claim 16, wherein the messaging client user interface includes messaging activity between the first client device and the second client device without activating the different application, and wherein the second user interface element is indicative of an option to install the different application on the second client device.

18. The at least one non-transitory computer-readable storage medium of claim 16, wherein the second user interface element is indicative of an option to invoke a link that allows for downloading and installing the different application on the second client device.

19. The at least one non-transitory computer-readable storage medium of claim 16, wherein the instructions, when executed by the one or more processors, further cause the one or more processors to:

determine whether the first client device is authorized to share activity metadata to the second client device according to a configuration setting stored on the first client device; and receive, during the messaging session and based on a determination that the first client device is authorized to share the activity metadata to the second client device, the activity metadata from the first client device.

20. The at least one non-transitory computer-readable storage medium of claim 16, wherein the messaging client user interface comprises a user selectable graphical element for initiating a communication session with one or more users via a different mode of communication.

* * * * *